(12) United States Patent
Hesse et al.

(10) Patent No.: US 8,180,297 B2
(45) Date of Patent: May 15, 2012

(54) ESTABLISHMENT OF COMMUNICATIONS CONNECTIONS BETWEEN VEHICLES

(75) Inventors: Michael Hesse, Eschborn (DE); Ulrich Stählin, Eschborn (DE)

(73) Assignee: Continental Teves AG & Co. oHG (DE)

( * ) Notice: Subject to any disclaimer, the term of this patent is extended or adjusted under 35 U.S.C. 154(b) by 388 days.

(21) Appl. No.: 12/446,781

(22) PCT Filed: Oct. 24, 2007

(86) PCT No.: PCT/EP2007/061443
§ 371 (c)(1),
(2), (4) Date: Apr. 23, 2009

(87) PCT Pub. No.: WO2008/049868
PCT Pub. Date: May 2, 2008

(65) Prior Publication Data
US 2010/0015963 A1    Jan. 21, 2010

(30) Foreign Application Priority Data

Oct. 25, 2006  (DE) .................. 10 2006 051 079
Oct. 24, 2007  (DE) .................. 10 2007 051 079

(51) Int. Cl.
*H04B 7/00* (2006.01)
(52) U.S. Cl. ............................................. 455/41.3
(58) Field of Classification Search .......... None
See application file for complete search history.

(56) References Cited

U.S. PATENT DOCUMENTS

| 5,274,699 | A | 12/1993 | Ranz |
| 2004/0003229 | A1* | 1/2004 | Reinold et al. ............... 713/155 |
| 2004/0209605 | A1 | 10/2004 | Urban et al. |
| 2005/0221876 | A1* | 10/2005 | Van Bosch et al. ........ 455/575.9 |
| 2007/0054685 | A1* | 3/2007 | Kellum .......................... 455/517 |
| 2009/0170434 | A1* | 7/2009 | Tengler et al. ............... 455/41.2 |

FOREIGN PATENT DOCUMENTS

| DE | 101 44 751 A1 | 3/2003 |
| DE | 10 2004 056 724 A1 | 5/2006 |
| GB | 2 358 506 A | 7/2001 |
| GB | 2 427 787 A | 1/2007 |

* cited by examiner

*Primary Examiner* — Lincoln Donovan
*Assistant Examiner* — Sibin Chen
(74) *Attorney, Agent, or Firm* — RatnerPrestia

(57) ABSTRACT

A method for setting up communication links between a first vehicle and at least one second vehicle using telematics units, wherein the telematics unit is activated by the respective driver, and the driver of the first vehicle uses the telematics unit to input registration identifiers into the telematics unit in the first vehicle, and the telematics unit in the first vehicle sets up a communication link to at least one second telematics unit in a second vehicle, and the registration identifier is checked by the telematics unit in the second vehicle via the communication link, and the registration identifier of the first vehicle is output to the driver of the second vehicle via the telematics unit in the vehicle, with setup of a communication link to the first vehicle being confirmed by an input, requested by the driver of the second vehicle, using the telematics unit in the second vehicle.

12 Claims, 1 Drawing Sheet

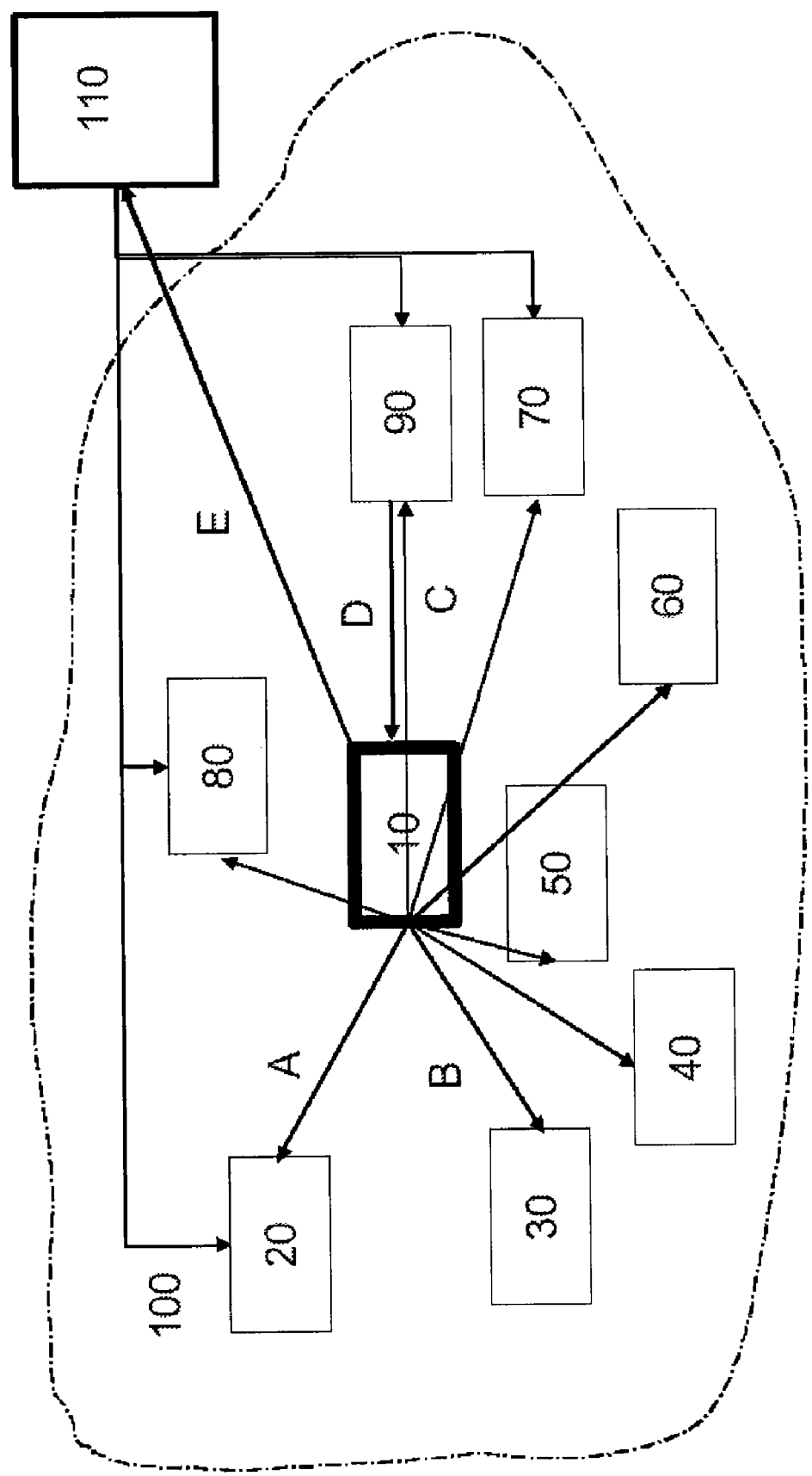

ESTABLISHMENT OF COMMUNICATIONS CONNECTIONS BETWEEN VEHICLES

CROSS REFERENCE TO RELATED APPLICATIONS

This application is the U.S. national phase application of PCT International Application No. PCT/EP2007/061443 filed Oct. 24, 2007, which claims priority to German Patent Application No. DE102006051079.8, filed Oct. 25, 2006 and German Patent Application No. DE102007051079.0, filed Oct. 24, 2007, the contents of such applications being incorporated by reference herein.

BACKGROUND OF THE INVENTION

1. Field of the Invention

The invention relates to a method and an apparatus for setting up data and communication links between vehicles.

2. Description of the Related Art

In digital communication systems, i.e. in communication systems in which the signal to be transferred is digitized and is transferred from the sender to the receiver in digital form, for example in mobile radio systems, optimum and efficient management of the entire system requires the number of bits for transferring a particular piece of information to be kept as small as possible. Such bit reduction is usually achieved by a particular kind of source encoding. In existing information systems, information about local events is brought together at central locations (servers). From there, the information is transmitted to the road users by radio systems by means of a broadcast. Such systems, such as broadcast radio based on analog transfer or digital transfer (DAB, Digital Audio Broadcasting) or, in future, based on DVB-T/S (Digital Video Broadcasting-Terrestrial/Satellite), are pure broadcast systems without functions for bidirectional transfer.

Alternatively, this information can be provided in mobile radio networks, e.g. based on the GSM, GPRS or UMTS standard (GSM: Global vehicle telematics apparatus for mobile communication; UMTS: Universal Mobile Telecommunication System), by means of supplementary services, such as a short message service (SMS), local radio data networks (W-LAN: Wireless Local Area Network) or information services. This allows the desired information to be retrieved in targeted fashion when required. Before it is possible to access the information, however, it needs to be transferred from the location of its occurrence to the central unit (server). Only from there is this information passed to the mobile end subscriber following connection setup. Before this information is available, the transfer to the server and from there to the end subscriber therefore takes time, which means that the contemporariness of the message suffers as a result and in many cases is worthless, e.g. if the road user is already at or close to the end of the tailback. Radio systems which exist at present therefore cannot be used to transfer time-critical messages.

DE 102004056724A1 discloses a method for transferring data in a communication network with direct vehicle-vehicle communication, wherein a receiving vehicle receives communication signals from a sending vehicle. The receiving vehicle ascertains or updates a piece of trust information, the trust information making it possible to establish whether data sent by the sending vehicle are trustworthy and/or how trustworthy data sent by the sending vehicle are. The trust information is ascertained using a user certificate which has been issued by a trustworthy institution and/or which has been produced by a device in the communication network using information from a first certificate issued by the trustworthy institution.

SUMMARY OF THE INVENTION

The invention relates to producing communication and data links between vehicles easily, reliably and quickly.

An advantage of the invention is the efficient implementation of a communication and data link between at least two vehicles by means of simple and reliable identification and authentication of the vehicles between which a communication link is intended to be set up.

The telematics unit is activated by the respective driver, and the driver of the first vehicle uses a man-machine interface on the telematics unit located in the first vehicle in order to input registration identifiers, representing the vehicle to be called, into the telematics unit located in the first vehicle, and the telematics unit in the first vehicle sets up a communication link to at least one second telematics unit in a second vehicle, and the registration identifier is checked by the telematics unit in the second vehicle via the communication link which has been set up, and the registration identifier of the first vehicle is output to the driver of the second vehicle via the telematics unit on a man-machine interface connected to the telematics unit in the vehicle, with setup of a communication link to the first vehicle being confirmed by an input, requested by the driver of the second vehicle, using the man-machine interface connected to the telematics unit and located in the second vehicle.

Aspects of the invention provide that the communication link involves the use of short-range communication.

Aspects of the invention provide for the communication link to be set up in unicast mode and/or multicast and/or broadcast mode and/or geocast mode.

Aspects of the invention provide that the drivers are identified and authenticated by the respective telematics unit using an interface on which captured data from an automatic environment recognition unit for registration identifiers are provided.

This means that additionally information is advantageously used for recognizing the requested vehicles.

The communication and data link is confirmed using a man-machine interface, with the registration identifier of the first vehicle being displayed in a reproduction unit in the second vehicle.

The object is likewise achieved by an apparatus for setting up communication links between vehicles which have interfaces for the input and output of data, wherein means for activating the telematics unit, means for inputting and storing a registration identifier, means for setting up a communication link and means for confirming the communication link are present.

The apparatus has provision for the means for inputting a registration identifier to be used to input a registration identifier multimodally.

In line with the invention, the apparatus has provision for the man-machine interface and the reproduction unit to be integrated in an electronic display. In this case, the reproduction may be implemented as a display with an into an housing with appropriate interfaces. Consideration has also been given to the reproduction being mounted independently of a housing, and therefore separately at a from the location in the vehicle interior such that it can easily be viewed by the driver.

According to aspects of the invention, the apparatus has provision for the apparatus to be incorporated as a module in a telematics unit.

BRIEF DESCRIPTION OF THE DRAWINGS

FIG. 1 shows the information paths of the invention.

DETAILED DESCRIPTION OF THE PREFERRED EMBODIMENTS

The exemplary embodiments of the invention are described in more detail below with reference to FIG. 1.

A communication link in the form of a voice and/or data link is intended to be set up between the drivers of two or more vehicles. To authenticate and identify itself, this is done using the information from the registration identifier. The registration identifier used may be not only identifiers visible from the outside but also identifiers which are present in vehicle components in digital form, such as the unique serial number of a vehicle component.

The text below illustrates the setup of a communication link between two vehicles as a first embodiment. For further vehicles wishing to be involved in the communication process, the mechanics of the method can be transferred in similar fashion.

In a first refinement, a communication link (voice or data) is set up by means of a direct communication link from vehicle to vehicle. To this end, each telematics unit in the contactable vehicles is first of all activated generally for this purpose by the driver. It should be noted that all of the vehicles 10 to 90 are respectively equipped with a telematics unit and are not shown explicitly in FIG. 1, but rather are therefore part of the respective vehicle. A vehicle is always understood to mean a vehicle with a telematics unit.

When a direct communication and data link activated by the driver is set up which is designed as a short-range communication and short-range data link such as DSRC, WLAN or another short-range communication link, the vehicles are in visual range and are able to exchange information with one another when the communication link has been set up. If the vehicles are at such a distance from one another that they are unable to communicate directly with one another, the vehicles situated in between forward the information which is to be exchanged. This sets up a secure network which is very powerful and has a good distribution of load for the volume of data between the vehicles.

To allow target-oriented forwarding of the communication request from the driver, the invention involves the use of protocols. These have the task of determining a path from the source vehicle to the destination vehicle. Depending on the particular local circumstances of the vehicles with respect to one another, it is possible to make these as short as possible or to use regions of the network with as little loading as possible, or region 100. This creates routing tables which comprise as few entries as possible and which are continually updated when vehicles "disappear", move or reappear. The time and the number of entries in the routing table which are required for finding a connection route are very short in the embodiment of the invention.

As already mentioned, a communication and data link is engaged by means of the input of the registration identifier(s), which individually or from a list with the option of multiple selection, which is displayed to the driver following activation. The entries and elements are produced automatically for the displayed list. Following the activation, the telematics unit sends its own registration A, B, C in broadcast mode and switches to what is known as a listen state. If it receives a response which is in the form of the registration identifier of the respective vehicle, the received registration identifier is then stored in the list in the telematics unit and visually displayed for the driver.

Each telematics unit therefore comprises a directory service which provides a central collection of registration identifiers. It is therefore possible for stored registration identifiers to be compared, sought, created, modified and deleted. In the simplest form, this is implemented by a lookup table. In one refinement, the directory service is in the form of a Lightweight Directory Access Protocol (LDAP) directory service, the telematics unit containing a memory which is sufficient for setting up an LDAP server. Alternatively, it can be connected as a module to the telematics unit via interfaces in the telematics unit.

If the driver of the first vehicle 10 wishes to set up a communication link, for example for voice or data, to a vehicle 90, he uses a voice interface or another kind of man-machine interface (MMS) to input the respective registration identifier, e.g. the registration identifier of the sought vehicle 90 which has been allocated for road traffic, into his telematics unit or selects it from his list the directory service.

The active and ready-to-send telematics unit in the vehicle 10 then successively sets up a communication link in the form of a pure data link to all of the ready-to-receive vehicles 20-90 which are equipped with a telematics unit and are situated in the environment 100, and uses this data link to check the registration identifier of the respective vehicles 20 to 90. If the vehicle is the requested vehicle 90, the driver of the vehicle 90 has the registration identifier of the requesting vehicle 10 displayed to him on a reproduction unit of the telematics unit in the vehicle 90, that is to say in his own vehicle, linked to the request for confirmation of whether a communication link, for example, for voice or data, is to be set up to this vehicle 10. If the driver of the vehicle 90 agrees, the communication link (voice or data) is set up and produced between the two vehicles. This then also allows SMS and MMS to be exchanged between the vehicles.

According to aspects of the invention, a data or communication link is set up by means of unicast, multicast or geocast routing and broadcast forwarding on the basis of the input or selection of the quantity of registration information by the driver. When a registration identifier is input and when the request for setup of a data or communication link to a further vehicle is input, unicast routing is used, which sets up a data or communication link to an individual vehicle. When at least two registration identifiers are input, either multicast routing sets up data or communication links to a plurality of vehicles or geocast routing sets up data or communication links from vehicle to vehicle in a particular geographical region. Provision is also made for broadcast forwarding to allow vehicles in the transmitter range to be contacted.

In line with the invention, consideration has been given to the vehicle 10 being able to input more than one registration identifier during selection and to initiate a three-way conference or conference call. This may involve participation by three or more vehicles. In line with the invention, the conference call is designed such that, for example, a conference call between the vehicles 10, 20, 30 allows the vehicle 40 to join or involves said vehicle being invited to join the existing conference by the vehicles 10, 20, 30. Any vehicle with a telematics unit can therefore independently dial into a conference call by inputting or confirming a registration identifier for a vehicle involved in a conference call, or any vehicle can draft additional vehicles into the conference call in progress.

On the basis of the specific conditions in the environment of the vehicle setting up a communication link, or the requesting driver, the routing algorithms which are usually used on the Internet are not used, since the vehicles have no prior knowledge about the topology of the network. The vehicles have to investigate this themselves and set it up themselves. If required and if particular requisites are in place, such as that no vehicles in communication range can be recognized by the driver, the invention provides the option of storing routing information in a central entity, such as an Internet service provider (ISP), so as to notify further vehicles of information obtained thereby about the network topology present and the routing information connected thereby, in order that this "knowledge" may be used effectively.

In a second embodiment, the communication link from a vehicle 10 is set up first of all to an infrastructure 110 and then to a vehicle 90 requested by the vehicle 10. In this case, the telematics unit of the vehicle 10 sets up a connection to an Internet service provider (ISP), for example. If the registration identifier of the vehicle is registered and enabled with this provider for the one communication service, such as voice or data, then, in similar fashion to the previously described embodiment of the vehicle-to-vehicle variant, a request is sent to the driver of the vehicle 90 and the communication link D is subsequently set up.

According to aspects of the invention, the man-machine interface (MMS) is simplified by providing a telematics unit having automatic recognition of registration identifiers. The telematics unit then provides the driver of the vehicle 10 with the registration identifiers of vehicles 20 to 90 in the environment of the vehicle 10 for selection. The telematics unit is connected to the sensor components of the vehicle 10 by means of a wired or mobile interface. If the vehicle has a sensor system for environment sensing, for example, the environment data ascertained by the sensor system are made available to the telematics unit. The telematics unit can use the provided environment data for verification purposes. If the vehicle 10 has a driver assistance system with a camera, the information from the camera regarding the registration identifiers present is evaluated and compared with the received registration identifiers. The applicant's patent application DE 10 2007 007 283.1 discloses how an analysis is performed for a registration identifier. The content of the application DE 10 2007 007 283.1 is part of the present application.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A method for setting up communication links between a first vehicle and at least one second vehicle using a first telematics unit and a second telematics unit located in the respective vehicles, the method comprising:
   selecting, by a driver of the first vehicle, a registration identifier of the second vehicle displayed on the first telematics unit;
   transmitting a request, including a registration identifier of the first vehicle, from the first telematics unit to the second telematics unit in response to the selection;
   confirming, by the driver of the second vehicle, the registration identifier of the first vehicle included in the request;
   wherein confirming the registration identifier of the first vehicle sets up a communication link between the first telematics unit and the second telematics unit that allows bidirectional messaging between the first telematics unit and the second telematics unit.

2. The method as claimed in claim 1, wherein the communication link involves the use of short-range communication.

3. The method as claimed in claim 1, wherein communication link is set up in unicast mode, multicast mode, broadcast mode, geocast mode, or any combination thereof.

4. The method as claimed in claim 1, wherein the drivers are identified and authenticated by the respective telematics unit using an interface on which captured data from an automatic environment recognition unit for registration identifiers are provided.

5. The method as claimed in claim 1, wherein a man-machine interface is used to display the registration identifier of the first vehicle in a reproduction unit in the second vehicle.

6. The method as claimed in claim 5, wherein the man-machine interface and the reproduction unit are integrated in an electronic display.

7. The method of claim 1, wherein a registration identifier of a third vehicle is displayed on the first telematics unit if the third vehicle is within communication range of the first vehicle.

8. The method of claim 7, wherein the third vehicle is determined to be in communication range of the first vehicle if the third vehicle can directly transmit a message to the first vehicle, or the third vehicle can indirectly transmit a message to the first vehicle through an intermediary vehicle.

9. An apparatus for setting up communication links between a first vehicle and a second vehicle which each having interfaces for inputting and outputting data to drivers of the first vehicle and the second vehicle, further comprising:
   means for inputting into the first vehicle interface, a registration identifier of the second vehicle,
   means for transmitting a request from the first vehicle interface to the second vehicle interface, the request including a registration identifier of the first vehicle,
   means for confirming by the second vehicle interface, the registration identifier of the first vehicle included in the request,
   means for setting up a communication link between the first vehicle interface and the second vehicle interface if the registration identifier of the first vehicle is confirmed, the set up link allowing bi-directional messaging between the first vehicle interface and the second vehicle interface.

10. The apparatus as claimed in claim 9, wherein the means for inputting and storing a registration identifier are used to input a registration identifier multimodally.

11. The apparatus as claimed in claim 9, wherein the apparatus is incorporated as a module in the telematics unit.

12. A method for setting up communication links between a first vehicle and at least one second vehicle using a first telematics unit and a second telematics unit located in the respective vehicles, said method comprising the steps of:
   activating the first and second telematics units;
   inputting a registration identifier of the second vehicle into the first telematics units of the first vehicle;

transmitting a request including a registration identifier of the first vehicle, from the first telematics unit in the first vehicle to the second telematics unit in the second vehicle;

confirming the registration identifier of the first vehicle received in the request by a driver of the second vehicle via the second telematics unit of the second vehicle; and setting up a communication link between the first telematics unit in the first vehicle and the second telematics unit in the second vehicle if the registration identifier of the first vehicle is confirmed, the link allowing bi-directional messaging between the first telematics unit and the second telematics unit.

* * * * *